United States Patent
Wang et al.

(10) Patent No.: US 12,467,900 B2
(45) Date of Patent: Nov. 11, 2025

(54) SYSTEMS AND METHODS FOR ASSESSING REFERENCE ELECTRODE ASSEMBLIES FOR ELECTROCHEMICAL CELLS

(71) Applicant: GM GLOBAL TECHNOLOGY OPERATIONS LLC, Detroit, MI (US)

(72) Inventors: Biqiong Wang, Madison Heights, MI (US); Insun Yoon, Troy, MI (US); Fang Dai, Troy, MI (US); Mark W. Verbrugge, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 485 days.

(21) Appl. No.: 17/880,518

(22) Filed: Aug. 3, 2022

(65) Prior Publication Data
US 2024/0044838 A1    Feb. 8, 2024

(51) Int. Cl.
*G01N 27/48*    (2006.01)
*G01N 27/30*    (2006.01)
*G01N 27/333*   (2006.01)

(52) U.S. Cl.
CPC .......... *G01N 27/48* (2013.01); *G01N 27/301* (2013.01); *G01N 27/333* (2013.01)

(58) Field of Classification Search
CPC .... G01N 27/48; G01N 27/301; G01N 27/333; G01N 27/416; Y02E 60/10; H01M 10/0525; H01M 10/48; G01R 31/385
See application file for complete search history.

(56) References Cited

U.S. PATENT DOCUMENTS

| | | |
|---|---|---|
| 10,418,622 B2 | 9/2019 | Koch et al. |
| 10,439,256 B2 | 10/2019 | Koch et al. |
| 10,700,376 B2 | 6/2020 | Koch |

(Continued)

FOREIGN PATENT DOCUMENTS

| | | |
|---|---|---|
| CN | 117517989 A | 2/2024 |
| DE | 102023101039 A1 | 2/2024 |

OTHER PUBLICATIONS

Yamada et al., "Review of the Design of Current Collectors for Improving the Battery Performance in Lithium-Ion and Post-Lithium-Ion Batteries," 2020, Electrochem, vol. 1, pp. 124-159 (Year: 2020).*

(Continued)

*Primary Examiner* — Luan V Van
*Assistant Examiner* — Kaylee Tseng
(74) *Attorney, Agent, or Firm* — Harness, Dickey & Pierce, P.L.C.

(57) ABSTRACT

A system for assessing a characteristic of a reference electrode assembly for an electrochemical cell that cycle lithium ions includes a controller and a test cell assembly. The test cell assembly includes a metal case electrically coupled to the controller and a test cell disposed within the metal case. The test cell includes a lithium metal layer and a separator assembly. The separator assembly includes a separator layer, a current collector layer deposited on the separator layer, and optionally an electroactive layer deposited on the separator layer such that the electroactive layer at least partially overlaps the current collector layer. The current collector layer is in direct physical contact with an electroactive layer and is electrically isolated from the lithium metal layer by the separator layer.

19 Claims, 5 Drawing Sheets

(56) References Cited

U.S. PATENT DOCUMENTS

| | | | |
|---|---|---|---|
| 11,245,105 B2 | 2/2022 | Dadheech et al. | |
| 11,374,268 B2 | 6/2022 | Gao et al. | |
| 11,813,958 B2 | 11/2023 | Koch et al. | |
| 2015/0287543 A1* | 10/2015 | Aksay | B82Y 40/00 |
| | | | 252/182.1 |
| 2015/0311516 A1* | 10/2015 | Chen | H01M 4/625 |
| | | | 429/223 |
| 2016/0043386 A1* | 2/2016 | Charrier | H01M 4/587 |
| | | | 429/213 |
| 2017/0324119 A1 | 11/2017 | Powell, Jr. et al. | |
| 2019/0140248 A1* | 5/2019 | Bae | H01M 50/574 |
| 2020/0366112 A1 | 11/2020 | Koch et al. | |
| 2021/0091424 A1 | 3/2021 | Gao et al. | |
| 2021/0247242 A1 | 8/2021 | Zhang et al. | |
| 2022/0181712 A1 | 6/2022 | Dadheech et al. | |
| 2022/0238932 A1 | 7/2022 | Gao et al. | |
| 2022/0255063 A1 | 8/2022 | Yersak et al. | |
| 2023/0291077 A1 | 9/2023 | Gao et al. | |

OTHER PUBLICATIONS

"Interface Power Hub Operator's Manual," 2017, Gamry Instruments, pp. 2-2 (Year: 2017).*

Jing Gao et al.; U.S. Appl. No. 17/160,553, filed Jan. 28, 2021, entitled "Electrochemical Cell Monitoring Assembly"; 32 pages.

Thomas A. Yersak et al.; U.S. Appl. No. 17/172,286, filed Feb. 10, 2021, entitled "Lithium-Containing Electrodes Including Ceramic Particles and Methods of Making the Same"; 71 pages.

Brian J. Koch et al.; U.S. Appl. No. 17/478,292, filed Sep. 17, 2021, entitled "Automated Reference Electrode Management"; 23 pages.

Jing Gao et al.; U.S. Appl. No. 17/689,220, filed Mar. 8, 2022, entitled "Multifunctional electrode Separator Assemblies with buillt-in Reference Electrodes and Thermal Enhancements"; 35 pages.

* cited by examiner

SYSTEMS AND METHODS FOR ASSESSING REFERENCE ELECTRODE ASSEMBLIES FOR ELECTROCHEMICAL CELLS

INTRODUCTION

This section provides background information related to the present disclosure which is not necessarily prior art.

The present disclosure generally relates to reference electrode assemblies and, more particularly, to systems and methods for evaluating reference electrode assemblies for electrochemical cells that include a working electrode, a counter electrode, and a reference electrode.

Reference electrode assemblies may be used in electrochemical cells that cycle lithium ions to monitor the individual electric potential of a negative electrode and/or of a positive electrode of the electrochemical cell during cycling.

SUMMARY

This section provides a general summary of the disclosure and is not a comprehensive disclosure of its full scope or all of its features.

The present disclosure relates to a system for assessing a characteristic of a current collector layer of a reference electrode assembly for an electrochemical cell that cycles lithium ions. the system comprises a controller and a test cell assembly. The test cell assembly comprises a first metal case and a test cell disposed within an interior of the first metal case. The first metal case comprises a top and a bottom that together define the interior of the first metal case. The top of the first metal case is electrically coupled to the controller via a first electrical connector and the bottom of the first metal case is electrically coupled to the controller via a second electrical connector. The test cell comprises a first electroactive layer, a first lithium metal layer, and a separator assembly disposed between the first electroactive layer and the first lithium metal layer. The separator assembly comprises a first separator layer having a first major surface and a current collector layer deposited on the first major surface of the first separator layer. The current collector layer is electrically isolated from the lithium metal layer by the first separator layer. The current collector layer is in direct physical contact with the first electroactive layer. The first lithium metal layer is electrically coupled to the top of the first metal case and the first electroactive layer is electrically coupled to the bottom of the first metal case.

The test cell assembly may further comprise a metal spacer and a biasing member disposed between the test cell and the top of the first metal case.

The top and the bottom of the first metal case may be electrically isolated from each other by a gasket.

The controller may be configured to generate a test cell cyclic voltammogram by applying an electric potential between the first electroactive layer and the first lithium metal layer, cycling the applied electric potential between an initial potential and a set potential, and measuring the electric current at the first electroactive layer as the applied electric potential is cycled between the initial potential and the set potential.

The controller may be configured to provide an indication of at least one of the ionic permeability of the current collector layer, the compatibility of the current collector layer and the first electroactive layer, or the electrochemical stability of the current collector layer in the environment of the test cell.

The system may further comprise a control cell assembly. The control cell assembly may comprise a second metal case and a control cell disposed within an interior of the second metal case. The second metal case may comprise a top and a bottom that together define the interior of the second metal case. The top of the second metal case may be electrically coupled to the controller via a third electrical connector and the bottom of the second metal case may be electrically coupled to the controller via a fourth electrical connector. The control cell may comprise a second electroactive layer, a second lithium metal layer, and a second separator layer disposed between and in direct physical contact with the second electroactive layer and the second lithium metal layer. The second lithium metal layer may be electrically coupled to the top of the second metal case and the second electroactive layer may be electrically coupled to the bottom of the second metal case.

The controller may be configured to generate a control cell cyclic voltammogram by applying an electric potential between the second electroactive layer and the second lithium metal layer, cycling the applied electric potential between an initial potential and a set potential, and measuring the electric current at the second electroactive layer as the applied electric potential is cycled between the initial potential and the set potential.

A method of assessing a characteristic of the current collector layer is disclosed. In the method, an electric potential may be applied between the first electroactive layer and the first lithium metal layer. The electric potential may be cycled between an initial potential and a set potential. The electric current at the first electroactive layer may be measured as the electric potential is cycled between the initial potential and the set potential. An electric potential of the first electroactive layer may be calculated. A test cell cyclic voltammogram of the electric current at the first electroactive layer versus the electric potential of the first electroactive layer may be generated. The test cell cyclic voltammogram may be compared to a control cell cyclic voltammogram to obtain an indication of at least one of the ionic permeability of the current collector layer, the compatibility of the current collector layer and the first electroactive layer, or the electrochemical stability of the current collector layer in the environment of the test cell.

A system for assessing a characteristic of a reference electrode assembly for an electrochemical cell that cycles lithium ions is disclosed. The system comprises a controller and a test cell assembly. The test cell assembly comprises a first metal case and a test cell disposed within an interior of the first metal case. The first metal case comprises top and a bottom that together define the interior of the first metal case. The top of the first metal case is electrically coupled to the controller via a first electrical connector and the bottom of the first metal case is electrically coupled to the controller via a second electrical connector. The test cell comprises a first lithium metal layer, an electrically insulating layer, and a separator assembly disposed between the first lithium metal layer and the electrically insulating layer. The separator assembly comprises a first separator layer having a first major surface, a current collector layer deposited on the first major surface of the first separator layer, and a first electroactive layer deposited on the first major surface of the first separator layer such that the first electroactive layer at least partially overlaps the current collector layer. The current collector layer is in direct physical contact with the first electroactive layer and is electrically isolated from the lithium metal layer by the first separator layer. The separator assembly extends beyond a periphery of the electrically insulating layer such that a central region of the first electroactive layer is physically spaced apart from the bottom of the first metal case by the electrically insulating layer and a peripheral region of the first electroactive layer is in direct physical contact with the bottom of the first metal case.

The first lithium metal layer may be electrically coupled to the top of the first metal case and the first electroactive layer may be electrically coupled to the bottom of the first metal case.

The electrically insulating layer may be disposed on the bottom of the first metal case and the separator assembly may be disposed on the bottom of the first metal case over the electrically insulating layer such that, during cycling of the test cell, electrons flow in a planar direction through the central region of the first electroactive layer and in a transverse direction through the peripheral region of the first electroactive layer.

The controller may be configured to generate a test cell cyclic voltammogram by applying an electric potential between the first electroactive layer and the first lithium metal layer, cycling the applied electric potential between an initial potential and a set potential, and measuring the electric current at the first electroactive layer as the applied electric potential is cycled between the initial potential and the set potential.

The controller may be configured to provide an indication of at least one of the electrochemical performance of the separator assembly or the electrochemical stability of the separator assembly in the environment of the test cell.

The system may further comprise a control cell assembly. The control cell assembly may comprise a second metal case and a control cell disposed within an interior of the second metal case. The second metal case may comprise a top and a bottom that together define the interior of the second metal case. The top of the second metal case may be electrically coupled to the controller via a third electrical connector and the bottom of the second metal case may be electrically coupled to the controller via a fourth electrical connector. The control cell may comprise a second lithium metal layer, a second electroactive layer disposed on a current collector foil, and a second separator layer disposed between the second lithium metal layer and the second electroactive layer. The second lithium metal layer may be electrically coupled to the top of the second metal case and the second electroactive layer may be electrically coupled to the bottom of the second metal case via the current collector foil.

The current collector foil may be in physical and electrical contact with the bottom of the second metal case.

A method for assessing a characteristic of the separator assembly is disclosed. The method may comprise: applying an electric potential between the first electroactive layer and the first lithium metal layer, cycling the electric potential between an initial potential and a set potential, measuring the electric current at the first electroactive layer as the electric potential is cycled between the initial potential and the set potential, calculating an electric potential of the first electroactive layer, generating a test cell cyclic voltammogram of the electric current at the first electroactive layer versus the electric potential of the first electroactive layer, and comparing the test cell cyclic voltammogram to a control cell cyclic voltammogram to obtain an indication of at least one of the electrochemical performance of the separator assembly or the electrochemical stability of the separator assembly in the environment of the test cell.

The method may further comprise: comparing the test cell cyclic voltammogram to the control cell cyclic voltammogram to determine whether voltage peaks depicted in the test cell cyclic voltammogram are in alignment with corresponding voltage peaks depicted in the control cell cyclic voltammogram.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings.

DETAILED DESCRIPTION

Figure 1:
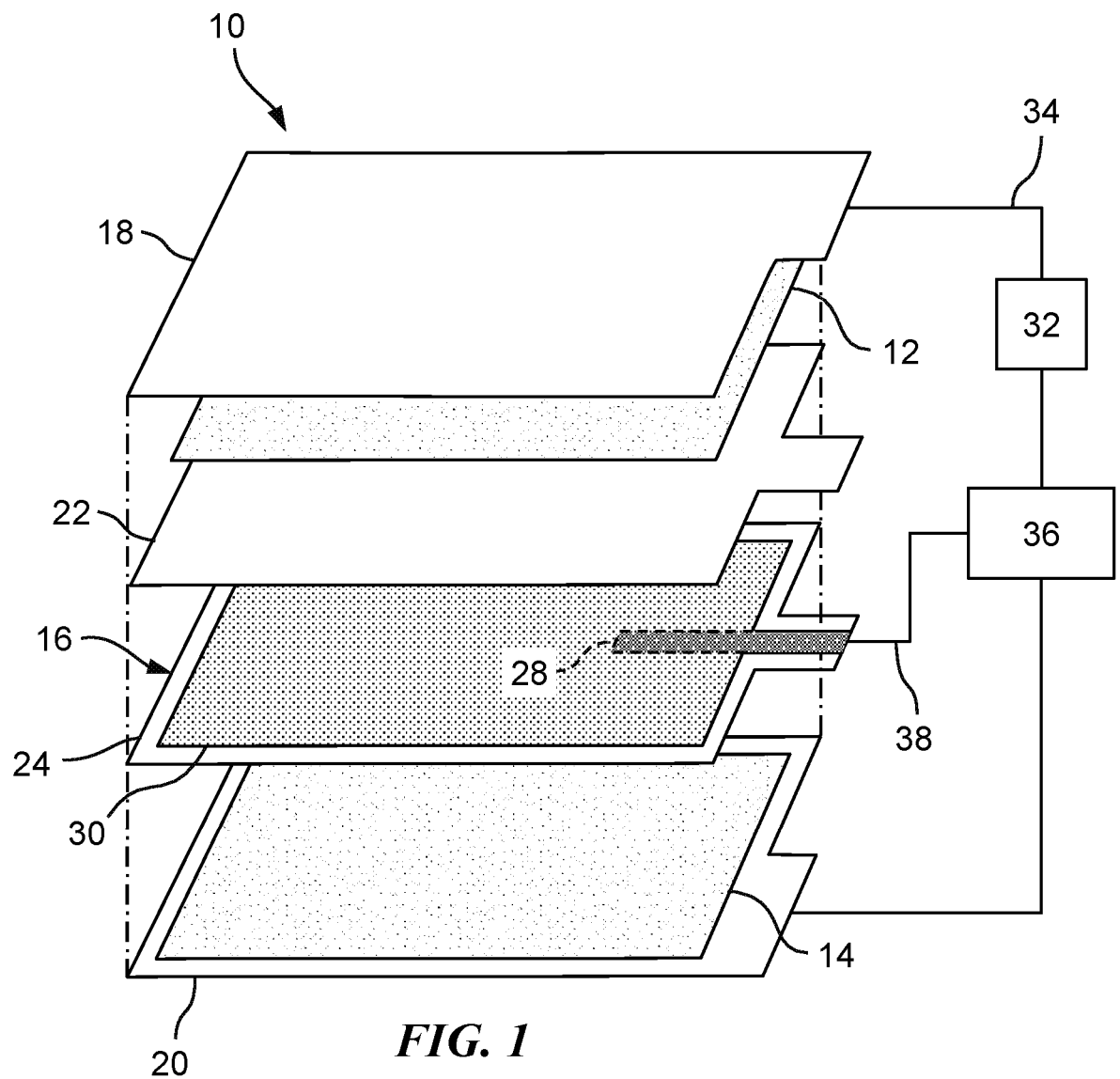
FIG. 1 is a perspective view of an electrochemical cell that cycles lithium ions, the electrochemical cell comprising a positive electrode, a negative electrode, a separator component disposed between the positive electrode and the negative electrode, and a reference electrode assembly disposed between the negative electrode and the separator component, the reference electrode assembly comprising a separator layer, a reference electrode current collector layer, and an electroactive reference electrode layer.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended terms "comprises," "comprising," "including," and "having," are to be understood as non-restrictive terms used to describe and claim various embodiments set forth herein, in certain aspects, the terms may alternatively be understood to instead be a more limiting and restrictive term, such as "consisting of" or "consisting essentially of." Thus, for any given embodiment reciting compositions, materials, components, elements, ingredients, features, integers, operations, and/or process steps, the present disclosure also specifically includes embodiments consisting of, or consisting essentially of, such recited compositions, materials, components, elements, ingredients, features, integers, operations, and/or process steps. In the case of "consisting of," the alternative embodiment excludes any additional compositions, materials, components, elements, ingredients, features, integers, operations, and/or process steps, while in the case of "consisting essentially of," any additional compositions, materials, components, elements, ingredients, features, integers, operations, and/or process steps that materially affect the basic and novel characteristics are excluded from such an embodiment, but any compositions, materials, components, elements, ingredients, features, integers, operations, and/or process steps that do not materially affect the basic and novel characteristics can be included in the embodiment.

Any method steps, processes, and operations described herein are not to be construed as necessarily requiring their performance in the order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer, or section. Terms such as "first," "second," and other numerical terms when used herein do not imply a sequence or order unless clearly indicated by the context. Thus, a first step, element, component, region, layer, or section discussed below could be termed a second step, element, component, region, layer, or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s), as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges and encompass minor deviations from the given values and embodiments, having about the value mentioned as well as those having exactly the value mentioned. Other than the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

As used herein, the terms "composition" and "material" are used interchangeably to refer broadly to a substance containing at least the preferred chemical constituents, elements, or compounds, but which may also comprise additional elements, compounds, or substances, including trace amounts of impurities, unless otherwise indicated. An "X-based" composition or material broadly refers to compositions or materials in which "X" is the single largest constituent of the composition or material on a weight percentage (%) basis. This may include compositions or materials having, by weight, greater than 50% X, as well as those having, by weight, less than 50% X, so long as X is the single largest constituent of the composition or material based upon its overall weight.

As used herein, the term "metal" may refer to a pure elemental metal or to an alloy of an elemental metal and one or more other metal or nonmetal elements (referred to as "alloying" elements). The alloying elements may be selected to impart certain desirable properties to the alloy that are not exhibited by the base metal element.

Example embodiments will now be described more fully with reference to the accompanying drawings.

The presently disclosed systems and methods can be used to assess characteristics of newly developed reference electrode assemblies and/or individual components thereof in a laboratory environment, without requiring the assembly of full electrochemical cells having a three-electrode configuration.

FIG. 1 depicts an exploded perspective view of an electrochemical cell 10 including a positive electrode layer 12, a negative electrode layer 14, and a reference electrode assembly 16 that may be used as a reference for accurately measuring the individual electrochemical potentials of the positive electrode layer 12 and the negative electrode layer 14, without interfering with the operation of the electrochemical cell 10. In assembly, the positive electrode layer 12 may be disposed on a major surface of a positive electrode current collector 18, the negative electrode layer 14 may be disposed on a major surface of a negative electrode current collector 20, and a separator component 22 may be disposed between the positive and negative electrode layers 12, 14 such that the positive and negative electrode layers 12, 14 are electrically isolated from each other. In practice, the positive and negative electrode current collectors 18, 20 may be electrically coupled to each other outside the electrochemical cell 10 via an external circuit 34. The positive and negative electrode current collectors 18, 20 may be electrically coupled to a power source or load 32 and to a controller 36 via the external circuit 34. The reference electrode assembly 16 may be electrically coupled to the controller 36 via a reference circuit 38.

The positive electrode layer 12 is porous and may comprise one or more electrochemically active materials that can undergo a reversible redox reaction with lithium, e.g., a material that can sufficiently undergo lithium intercalation and deintercalation, alloying and dealloying, or plating and stripping. In one form, the positive electrode layer 12 may comprise an intercalation host material that can undergo the reversible insertion or intercalation of lithium ions. In such case, the intercalation host material of the positive electrode layer 12 may comprise a layered oxide represented by the formula $LiMeO_2$, an olivine-type oxide represented by the formula $LiMePO_4$, a spinel-type oxide represented by the formula $LiMe_2O_4$, a tavorite represented by one or both of the following formulas $LiMeSO_4F$ or $LiMePO_4F$, or a combination thereof, where Me is a transition metal (e.g., Co, Ni, Mn, Fe, Al, V, or a combination thereof). In another form, the positive electrode layer 12 may comprise a conversion material including a component that can undergo a reversible electrochemical reaction with lithium, in which the component undergoes a phase change or a change in crystalline structure accompanied by a change in oxidation state. In such case, the conversion material of the positive electrode layer 12 may comprise sulfur, selenium, tellurium, iodine, a halide (e.g., a fluoride or chloride), sulfide, selenide, telluride, iodide, phosphide, nitride, oxide, oxysulfide, oxyfluoride, sulfur-fluoride, sulfur-oxyfluoride, or a lithium and/or metal compound thereof. Examples of suitable metals for inclusion in the conversion material of the positive electrode layer 12 include iron, manganese, nickel, copper, and cobalt. In embodiments, the electrochemically active material of the positive electrode layer 12 may be intermingled with a polymeric binder to provide the positive electrode layer 12 with structural integrity. Examples of polymeric binders include polyvinylidene fluoride (PVdF), ethylene propylene diene monomer (EPDM) rubber, styrene butadiene rubber (SBR), carboxymethyl cellulose (CMC), polyacrylic acid, and mixtures thereof. The positive electrode layer 12 optionally may include particles of an electrically conductive material, which may comprise very fine particles of, for example, high-surface area carbon black.

The negative electrode layer 14 may be porous or non-porous. In some aspects, the negative electrode layer 14 may comprise, consist essentially of, or consist of lithium (Li) metal. For example, in some aspects, the negative electrode layer 14 may comprise, by weight, greater than 97% lithium or greater than 99% lithium and may be substantially free of elements or compounds that undergo a reversible redox reaction with lithium during operation of the electrochemical cell 10. In other aspects, the negative electrode layer 14 may comprise may comprise one or more electrochemically active materials that can undergo the reversible insertion or intercalation of lithium ions at a lower electrochemical potential than the electrochemically active materials of the positive electrode layer 12 such that an electrochemical potential difference exists between the positive and negative electrode layers 12, 14. The electrochemically active material of the negative electrode layer 14 may be generally described as an intercalation host material. Some examples of intercalation host materials for the electrochemically active material of the negative electrode layer 14 include carbon-based materials (e.g., graphite, activated carbon, carbon black, carbon nanotubes, and graphene), lithium, lithium-based materials, silicon, silicon-based alloys or composite materials, tin oxide, aluminum, indium, zinc, germanium, silicon oxide, titanium oxide, lithium titanate, and combinations thereof. The same polymeric binder materials (PVdF, EPDM, SBR, CMC, polyacrylic acid) and electrically conductive particles (high-surface area carbon black) used in the positive electrode layer 12 also may be intermingled with the electrochemically active materials of the negative electrode layer 14 for the same purposes.

The positive and negative electrode current collectors 18, 20 may comprise a material that can collect and reversibly pass free electrons to and from their respective electrode layers 12, 14. For example, the positive and negative electrode current collectors 18, 20 may comprise an electrically conductive metal, e.g., a transition metal or alloy thereof. In embodiments, the negative electrode current collector 20 may comprise copper, nickel, an iron alloy (e.g., stainless steel), or titanium, and the positive electrode current collector 18 may comprise aluminum, nickel, or an iron alloy (e.g., stainless steel). Other electrically conductive metals may of course be used, if desired.

The separator component 22 is configured to physically separate and electrically insulate the positive and negative electrode layers 12, 14 from each other while permitting the free flow of ions therebetween. The separator component 22 may comprise a non-woven material, e.g., a manufactured sheet, web, or matt of directionally or randomly oriented fibers. The separator component 22 may comprise a microporous polymeric material, e.g., a microporous polyolefin-based membrane or film. For example, the separator component 22 may comprise a single polyolefin or a combination of polyolefins, such as polyethylene (PE), polypropylene (PP), polyamide (PA), poly(tetrafluoroethylene) (PTFE), polyvinylidene fluoride (PVdF), and/or poly(vinyl chloride) (PVC). In one form, the separator component 22 may comprise a laminate of one or more polymeric materials, such as a laminate of PE and PP. The separator component 22 may have a thickness in the range of 20 μm to 30 μm and a porosity in a range of 35% to 50%.

The reference electrode assembly 16 is configured to serve as a reference for monitoring the potential of the positive and negative electrode layers 12, 14, without interfering with the operation of the electrochemical cell 10, in particular, without inhibiting the free flow of ions between the positive and negative electrode layers 12, 14. The reference electrode assembly 16 comprises a separator layer 24 having a first major surface 26, a reference electrode current collector layer 28 deposited on the first major surface 26 of the separator layer 24, and an electroactive reference electrode layer 30 deposited on the first major surface 26 of the separator layer 24 such that at least a portion of the reference electrode layer 30 partially overlaps the reference electrode current collector layer 28 on the first major surface 26 of the separator layer 24. The reference electrode assembly 16 may be disposed between the positive and negative electrode layers 12, 14 such that the reference electrode current collector layer 28 and the reference electrode layer 30 are electrically isolated from the positive and negative electrode layers 12, 14 by the separator component 22 and the separator layer 24.

The separator layer 24 is configured to electrically insulate the reference electrode current collector layer 28 and the reference electrode layer 30 from the positive electrode layer 12 or the negative electrode layer 14 while permitting the free flow of ions therethrough. The separator layer 24 may serve as a substrate on which the reference electrode current collector layer 28 and the reference electrode layer 30 are formed and may help position the reference electrode current collector layer 28 and the reference electrode layer 30 in the electrochemical cell 10. Like the separator component 22, the separator layer 24 may comprise an electrically insulating and ion-permeable microporous material. For example, the separator layer 24 may comprise a microporous polymeric material. The separator layer 24 may have a thickness in the range of 10 μm to 20 μm and a porosity of greater than 40% and less than 80%.

The reference electrode current collector layer 28 is configured to provide an electrically conductive pathway between the reference electrode layer 30 and the reference circuit 38, without inhibiting the free flow of ions between the positive and negative electrode layers 12, 14 of the electrochemical cell 10. The reference electrode current collector layer 28 may comprise a comprise a material that can collect and reversibly pass free electrons to and from the reference electrode layer 30, without inhibiting ionic transport through the reference electrode assembly 16. For example, the reference electrode current collector layer 28 may comprise an electrically conductive carbon-based material or an electrically conductive metal, e.g., a transition metal or alloy thereof. Examples of electrically conductive metals include copper, nickel, iron (e.g., stainless steel), titanium, aluminum, and/or nickel. Other electrically conductive metals may of course be used, if desired. The reference electrode current collector layer 28 may be deposited on the first major surface 26 of the separator layer 24 at a thickness in a range of 10 nanometers to 1 micrometer.

The reference electrode layer 30 at least partially overlaps the reference electrode current collector layer 28 on the first major surface 26 of the separator layer 24 and is configured to exhibit a known, generally constant electrochemical potential that can be used as a reference in measuring the individual electrochemical potentials of the positive and negative electrode layers 12, 14. As such, the reference electrode layer 30 preferably comprises an electrochemically active reference electrode material that exhibits a known, generally constant chemical potential (or does not vary much) during operation of the electrochemical cell 10, e.g., during repeated charging and discharging cycles. Also, the reaction kinetics of the electrochemically active reference electrode material of the reference electrode layer 30 may be facile so that the small amount of current flow required to obtain a measurement of the electrochemical potential difference between the reference electrode layer 30 and the positive and negative electrode layers 12, 14 should not cause polarization of the reference electrode layer 30 itself. For example, the electrochemically active reference electrode material of the reference electrode layer 30 may comprise lithium iron phosphate (LiFePO$_4$, LFP) or lithium titanium oxide (Li$_4$Ti$_5$O$_{12}$, LTO). The reference electrode layer 30 may be deposited on the first major surface 26 of the separator layer 24 at a thickness in a range of 200 nanometers to 10 micrometers.

The controller 36 is electrically connected to (i) the positive electrode layer 12 via the positive electrode current collector 18 and the external circuit 34, (ii) the negative electrode layer 14 via the negative electrode current collector 20 and the external circuit 34, and (iii) the reference electrode layer 30 via the reference electrode current collector layer 28, and the reference circuit 38. The controller 36 may be configured to measure the potential difference between the positive electrode layer 12 and the negative electrode layer 14 in real-time to determine the overall electrochemical potential (Ecell) of the electrochemical cell 10 during the cycling of the electrochemical cell 10. The controller 36 may be configured to measure the potential difference between the reference electrode layer 30 and the positive electrode layer 12 and, based upon this measurement, to calculate the electrochemical potential (Epos) of the positive electrode layer 12. In addition, the controller 36 may be configured to measure the potential difference between the reference electrode layer 30 and negative electrode layer 16 and, based upon this measurement, to calculate the electrochemical potential (Eneg) of the negative electrode layer 14. The value of the overall electrochemical potential of the electrochemical cell 10 and of the individual electrochemical potentials of the positive and negative electrode layers 12, 14 may be used by the controller 36, for example, to accurately determine the state of charge (SOC) of the electrochemical cell 10. An accurate determination of the state of charge of the electrochemical cell 10 can be used to identify certain optimum charging parameters that can be used to achieve fast charging rates without impairing the overall functionality and/or long-term cycle stability of the electrochemical cell 10. In addition, an accurate measurement of the electrochemical potential of the negative electrode layer 14 in real-time may allow the charging process to be performed at the fastest charging rate and to be terminated before lithium plating occurs.

The positive and negative electrode layers 12, 14, the separator component 22, and the reference electrode assembly 16 may be infiltrated and/or in ionic contact with an electrolyte (not shown) that facilitates the permeation of lithium ions through and between the positive and negative electrode layers 12, 14 during cycling of the electrochemical cell 10. The electrolyte may be formulated to facilitate the transport of lithium ions between the positive electrode layer 12 and the negative electrode layer 14 during cycling of the electrochemical cell 10. The electrolyte may be in the form of a liquid, solid, or a gel polymer electrolyte. The electrolyte may be in the form of a solution and may comprise one or more lithium salts dissolved in a nonaqueous aprotic organic solvent or a mixture of nonaqueous aprotic organic solvents. Examples of lithium salts include lithium hexafluorophosphate (LiPF$_6$), lithium perchlorate (LiClO$_4$), lithium tetrachloroaluminate (LiAlCl$_4$), lithium iodide (LiI), lithium bromide (LiBr), lithium thiocyanate (LiSCN), lithium tetrafluoroborate (LiBF$_4$), lithium tetraphenylborate (LiB(C$_6$H$_5$)$_4$), lithium bis(oxalato)borate (LiB(C$_2$O$_4$)$_2$) (LiBOB), lithium difluorooxalatoborate (LiBF$_2$(C$_2$O$_4$)), lithium hexafluoroarsenate (LiAsF$_6$), lithium trifluoromethanesulfonate (LiCF$_3$SO$_3$), lithium bis(trifluoromethane) sulfonylimide (LiN(CF$_3$SO$_2$)$_2$), lithium bis(fluorosulfonyl) imide (LiN(FSO$_2$)$_2$) (LiSFI), and combinations thereof. Examples of nonaqueous aprotic organic solvents include organic carbonates, for example, cyclic carbonates (e.g., ethylene carbonate (EC), propylene carbonate (PC), butylene carbonate (BC), fluoroethylene carbonate (FEC)), linear carbonates (e.g., dimethyl carbonate (DMC), diethyl carbonate (DEC), ethylmethylcarbonate (EMC)), aliphatic carboxylic esters (e.g., methyl formate, methyl acetate, methyl propionate), γ-lactones (e.g., γ-butyrolactone, γ-valerolactone), chain structure ethers (e.g., 1,2-dimethoxyethane, 1-2-diethoxyethane, ethoxymethoxyethane), cyclic ethers (e.g., tetrahydrofuran, 2-methyltetrahydrofuran), 1,3-dioxolane), sulfur compounds (e.g., sulfolane), and combinations thereof.

Scientific advancements and discoveries may bring to light new material compositions and/or manufacturing methods for reference electrode assemblies of electrochemical cells, such as the reference electrode assembly 16 depicted in FIG. 1. Prior to manufacturing full electrochemical cells with newly developed reference electrode assemblies, it may be desired to test the reference electrode assemblies and/or to test newly developed individual components thereof in a laboratory or other small-scale environment. The presently disclosed systems and methods can be used to evaluate and obtain data related to the performance and/or compatibility of newly developed reference electrode assemblies and/or individual components thereof, without having to manufacture full electrochemical cells having a three-electrode configuration, such as the full three-electrode electrochemical cell 10 depicted in FIG. 1. The presently disclosed systems and methods use specifically designed cell assemblies having two-electrode configurations to evaluate newly developed reference electrode assemblies and/or individual components thereof. Using the presently disclosed cell assemblies in two-electrode configurations requires less material and is less expensive than assembling full electrochemical cells with three-electrode configurations for initial testing purposes.

Figure 2:
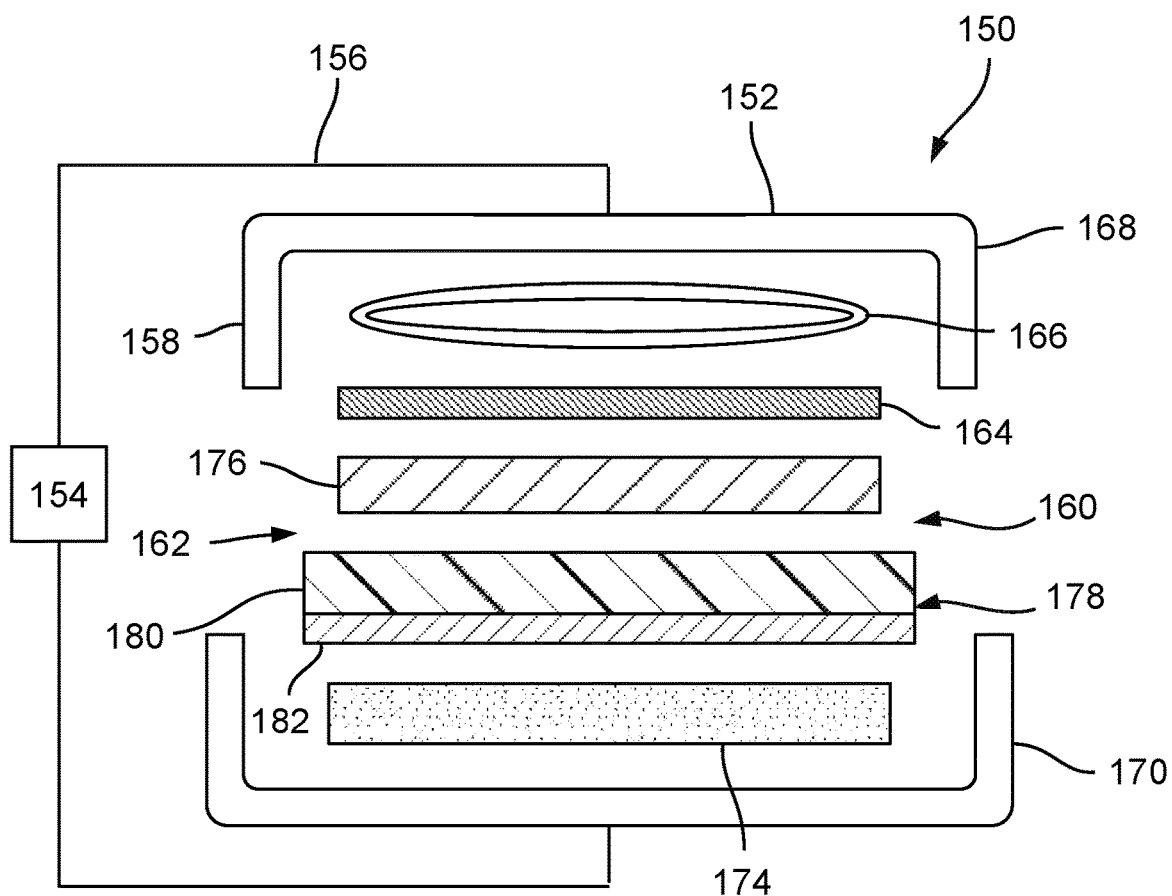
FIGS. 2 and 3 are schematic cross-sectional views of a system for assessing a characteristic of a current collector layer proposed for use in the reference electrode assembly of FIG. 1, the system comprising a controller and a test cell assembly, the test cell assembly comprising a two-electrode electrochemical test cell including the proposed current collector layer.
Figure 3:
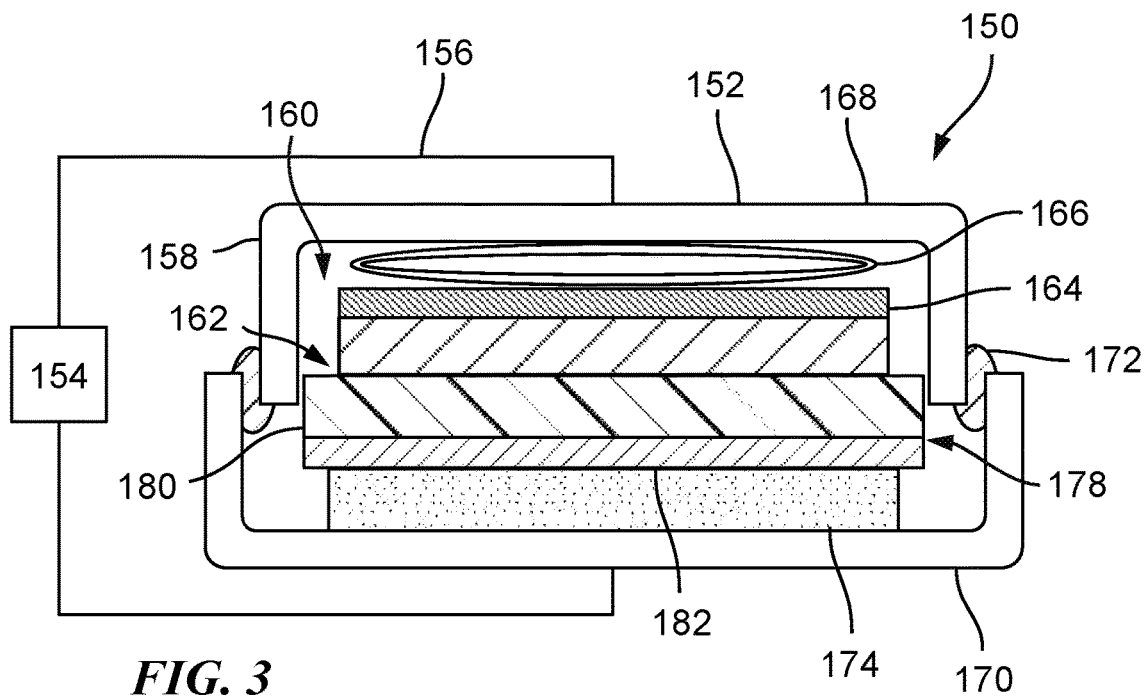

FIGS. 2 and 3 depict a system 150 for assessing a characteristic of a current collector layer deposited on a separator layer and proposed for use in a reference electrode assembly of an electrochemical cell that cycles lithium ions, such as the electrochemical cell 10 depicted in FIG. 1. The system 150 comprises a test cell assembly 152 and a controller 154. The test cell assembly 152 comprises a metal case 158 defining an interior 160 and a two-electrode electrochemical test cell 162 disposed within the interior 160 and electrically coupled to the metal case 158. The test cell assembly 152 may further comprise a metal spacer 164 and/or a biasing member 166 that help position the test cell 162 within the interior 160 and maintain pressure on the test cell 162 and ensure good contact between the components of the test cell 162 and between the test cell 162 and the metal case 158. The metal case 158 and the test cell 162 of the test cell assembly 152 depicted in FIGS. 2 and 3 are generally round and such configuration is oftentimes referred to as a coin cell configuration. The presently disclosed cell assemblies, however, are not limited to such configuration and may exhibit different shapes.

The metal case 158 comprises a top 168 and a bottom 170 that together define the interior 160 of the metal case 158. The top 168 and the bottom 170 may be hermetically sealed together via a gasket 172. The metal case 158 may be made of an electrically conductive and chemically inert metal, e.g., stainless steel. The gasket 172 may be made of a flexible electrically insulating material, e.g., rubber.

The test cell 162 comprises a working electrode in the form of an electroactive layer 174, a counter electrode in the form of a lithium metal layer 176, and a separator assembly 178 disposed between the electroactive layer 174 and the lithium metal layer 176. In assembly (FIG. 3), the electroactive layer 174 and the lithium metal layer 176 are electrically coupled to the metal case 158 and the metal case 158 is electrically coupled to the controller 154 via an external circuit 156. In FIG. 3, the electroactive layer 174 is electrically coupled to the bottom 170 of the metal case 158, the lithium metal layer 176 is electrically coupled to the top 168 of the metal case 158, and the top 168 and bottom 170 of the metal case 158 are electrically isolated from one another by the gasket 172. The separator assembly 178 comprises a separator layer 180 and a current collector layer 182 deposited directly on and mechanically coupled to the separator layer 180.

The test cell 162 is configured to mimic the physical and electrochemical conditions that would be experienced by the current collector layer 182 if the current collector layer 182 were incorporated into a reference electrode assembly of a full three-electrode electrochemical cell, such as the electrochemical cell 10 of FIG. 1. As such, the composition of the separator layer 180 and of the electroactive layer 174 may be substantially the same as that of the separator layer 24 and of the reference electrode layer 30, respectively, with which the current collector layer 182 will be or is proposed for use.

Cyclic voltammetry experiments may be performed by the system 150 on the test cell 162 of the test cell assembly 152 and on a control cell of a control cell assembly (not shown) to assess characteristics of the current collector layer 182 and/or to assess the compatibility and/or electrochemical stability of the current collector layer 182 in the environment of the test cell 162. The control cell and the control cell assembly may be configured to serve as an experimental control so that an accurate assessment of the current collector layer 182 can be made. As such, the control cell may include the same components arranged in substantially the same way as that of the test cell 162, except that the control cell may not include the current collector layer 182 being assessed. In some situations, cyclic voltammetry experiments may be performed by the system 150 on the control cell prior to performing cyclic voltammetry experiments on the test cell 162. In such case, the cyclic voltametric data generated during the cyclic voltammetry experiments performed on the control cell may be stored in memory of the controller 154 for future reference in assessing certain characteristics of the current collector layer 182.

The cyclic voltammetry experiments performed on the test cell 162 and on the control cell may be controlled by the controller 154. During the cyclic voltammetry experiments, an electric potential may be applied between the electroactive layer 174 and the lithium metal layer 176 by the controller 154. The potential of the electroactive layer 174 may be calculated by the controller 154 based upon the applied electric potential between the electroactive layer 174 and the lithium metal layer 176 and the electric potential of the lithium metal layer 176, which maintains a constant potential. During the cyclic voltammetry experiments, the potential of the electroactive layer 174 (relative to that of the lithium metal layer 176) is ramped from an initial potential to a set potential, and then the potential of the electroactive layer 174 is ramped in the opposite direction to return the potential to the initial potential. As the potential of the electroactive layer 174 is cycled, the electric current at the electroactive layer 174 may be continuously, periodically, or repeatedly measured by the controller 154 and stored in memory. The current and the potential of the electroactive layer 174 are recorded during the cyclic voltammetry experiments by the controller 154 and may be stored in memory of the controller 154. The current and the potential of the electroactive layer 174 (the cyclic voltametric data) recorded during the cyclic voltammetry experiments may be plotted against each other (Current, I vs. Potential, V) to obtain a cyclic voltammogram. Cyclic voltammograms may be prepared, for example, by the controller 154 using the cyclic voltametric data generated during the cyclic voltammetry experiments performed on the control cell and using the cyclic voltametric data generated during the cyclic voltammetry experiments performed on the test cell 162.

Figure 4:
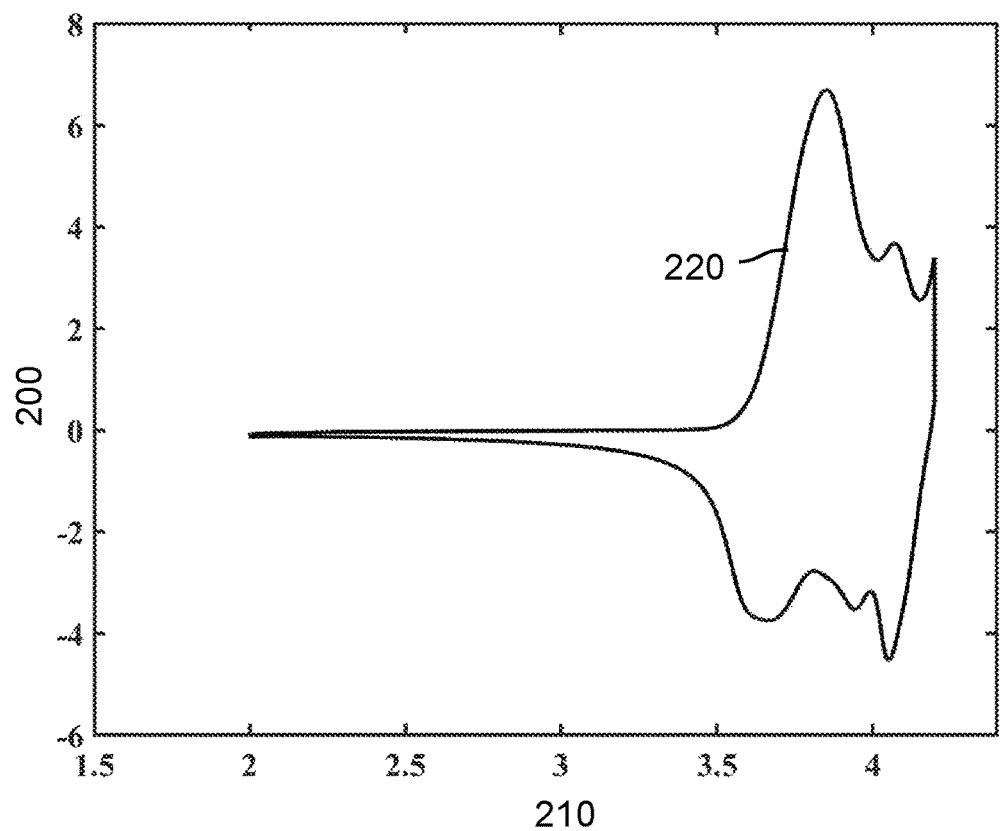
FIG. 4 is a cyclic voltammogram of Current (I) vs. Potential (V) of the two-electrode electrochemical test cell of FIGS. 2 and 3.
Figure 5:
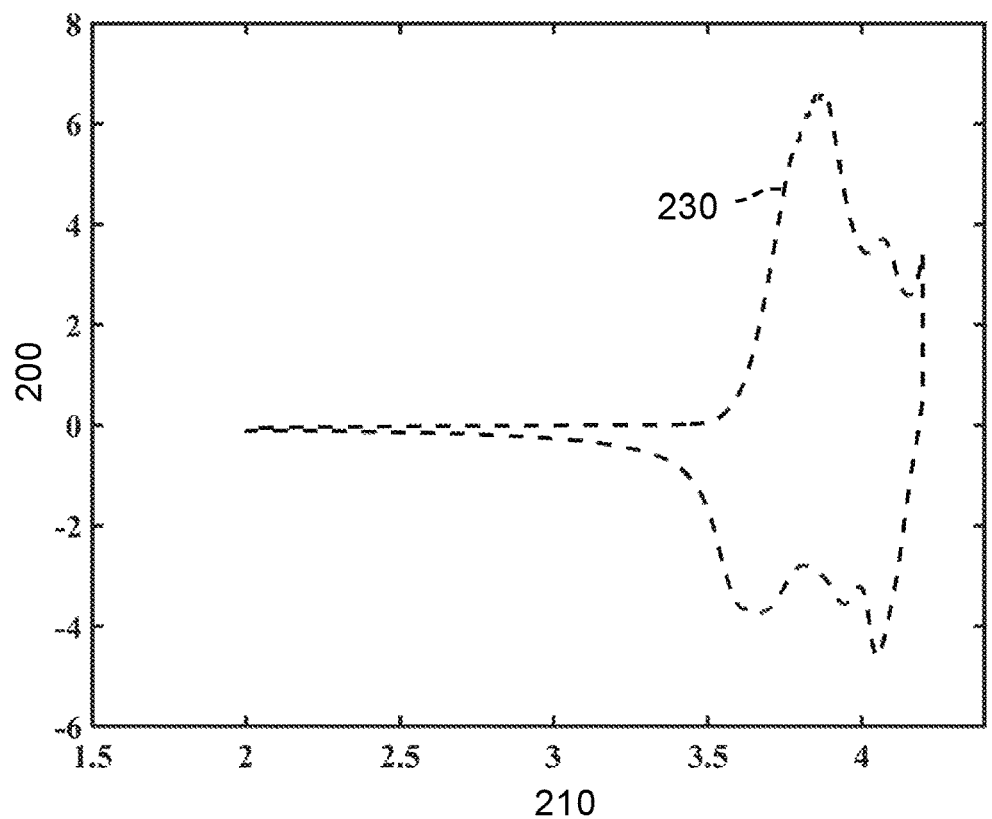
FIG. 5 is a cyclic voltammogram of Current (I) vs. Potential (V) of a two-electrode electrochemical control cell.

A comparison of the cyclic voltammogram of the test cell 162 and the cyclic voltammogram of the control cell may provide an indication of the ionic permeability of the current collector layer 182, as well as an indication of the compatibility and/or electrochemical stability of the current collector layer 182 in the environment of the test cell 162. FIG. 4 depicts an example cyclic voltammogram 220 of Current (I) 200 vs. Potential (V) 210 of the test cell 162 (solid lines). FIG. 5 depicts an example cyclic voltammogram 230 of Current (I) 200 vs. Potential (V) 210 of the control cell (dashed lines). As shown in FIGS. 4 and 5, the cyclic voltammogram 220 of the test cell 162 and the cyclic voltammogram 230 of the control cell are substantially identical. The absence of identifiable differences between the cyclic voltammogram 220 of the test cell 162 and the cyclic voltammogram 230 of the control cell indicates that the current collector layer 182 does not inhibit the flow of lithium ions between the electroactive layer 174 and the lithium metal layer 176, and thus the current collector layer 182 exhibits sufficient ionic permeability to be used as a reference electrode current collector layer in a reference electrode assembly. In addition, the absence of identifiable differences between the cyclic voltammogram 220 of the test cell 162 and the cyclic voltammogram 230 of the control cell indicates that the presence of the current collector layer 182 in the test cell 162 does not impair or alter the cycling performance of the test cell 162 (as compared to that of the control cell), and thus the current collector layer 182 is compatible with and electrochemically stable in the environment of the test cell 162.

On the other hand, if the cyclic voltammogram 220 of the test cell 162 was substantially different than the cyclic voltammogram 230 of the control cell, such differences may indicate that the ionic permeability of the current collector layer 182 is low, and/or that the current collector layer 182 is incompatible and/or electrochemically unstable in the environment of the test cell 162.

The thickness of the current collector layer 182 may be determined using atomic force microscopy (AFM).

The electrical resistivity of the current collector layer 182 may be determined using a four-point probe technique.

Figure 6:
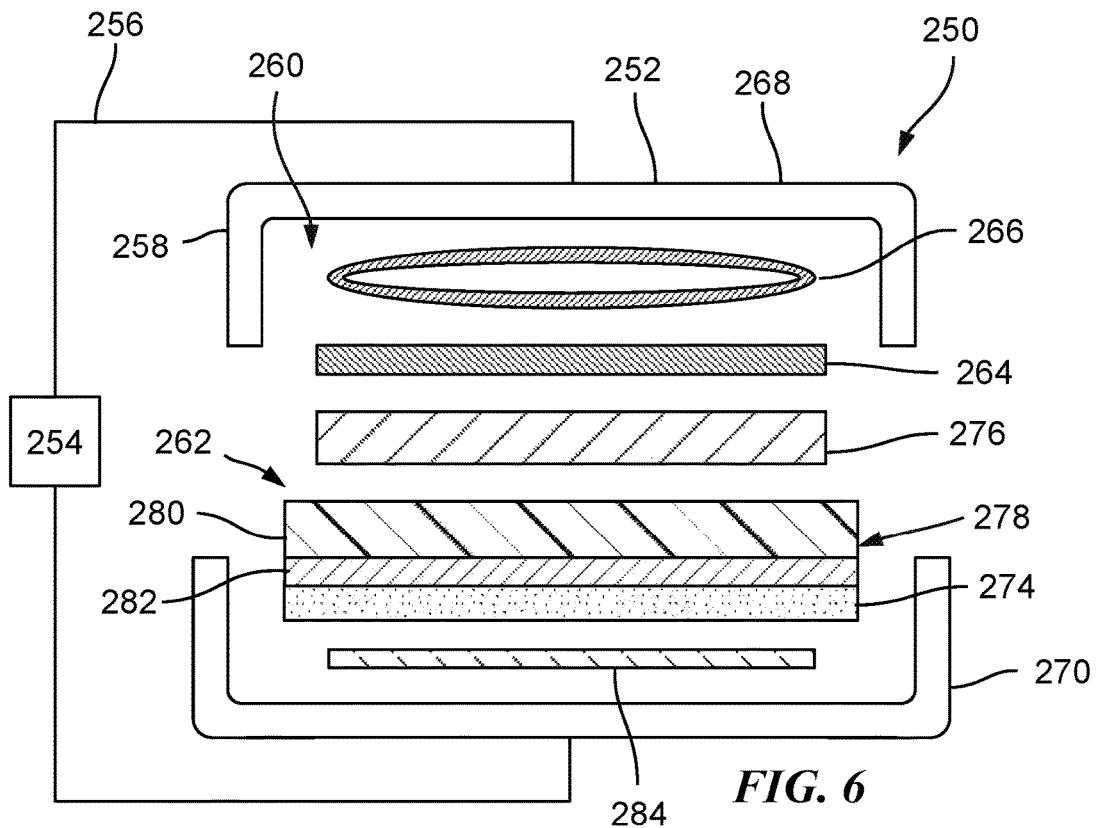
FIGS. 6 and 7 are schematic cross-sectional views of a system for assessing a characteristic of a reference electrode assembly proposed for use in the electrochemical cell of FIG. 1, the system comprising a controller and a test cell assembly, the test cell assembly comprising a two-electrode electrochemical test cell including a separator assembly.
Figure 7:
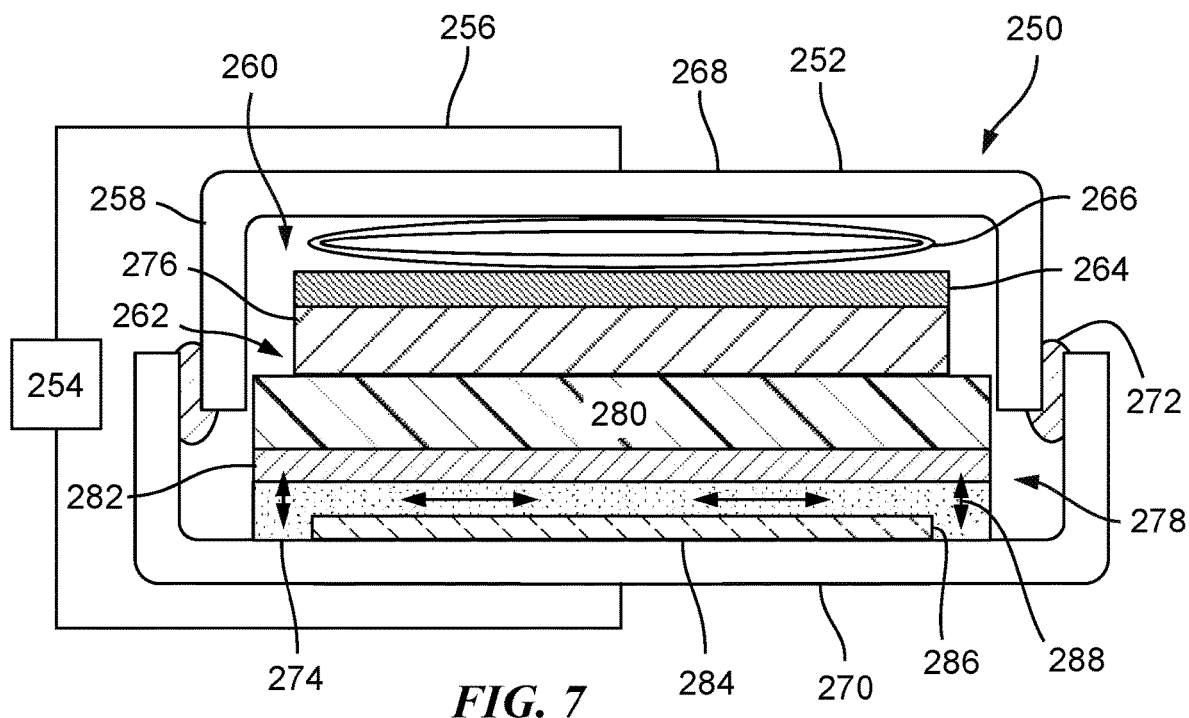

FIGS. 6 and 7 depict a system 250 for assessing a characteristic of a current collector layer and a reference electrode layer deposited on a separator layer and proposed for use in a reference electrode assembly of an electrochemical cell that cycles lithium ions, such as the electrochemical cell 10 depicted in FIG. 1. The system 250 is similar in many respects to the system 150 discussed above with respect to FIGS. 2-5 and common subject matter may not be repeated here. The system 250 comprises a test cell assembly 252 and a controller 254. The test cell assembly 252 comprises a metal case 258 defining an interior 260 and a two-electrode electrochemical test cell 262 disposed within the interior 260 and electrically coupled to the metal case 258. The test cell assembly 252 may further comprise a metal spacer 264 and/or a biasing member 266 that help position the test cell 262 within the interior 260 and maintain pressure on the test cell 262 and ensure good contact between the components of the test cell 262 and between the test cell 262 and the metal case 258.

The metal case 258 comprises a top 268 and a bottom 270 that together define the interior 260 of the metal case 258. The top 268 and the bottom 270 may be hermetically sealed together via a gasket 272. The metal case 258 may be made of an electrically conductive and chemically inert metal, e.g., stainless steel. The gasket 272 may be made of a flexible electrically insulating material, e.g., rubber.

The test cell 262 comprises a lithium metal layer 276, an electrically insulating layer 284, and a separator assembly 278 disposed between the lithium metal layer 276 and the electrically insulating layer 284. The separator assembly 278 comprises a separator layer 280 having a first major surface and an opposite second major surface, a current collector layer 282 deposited on the first major surface of the separator layer 280, and an electroactive layer 274 deposited on the first major surface of the separator layer 280 such that the electroactive layer 274 at least partially overlaps the current collector layer 282 on the first major surface of the separator layer 280. As shown in FIGS. 6 and 7, in some instances, the current collector layer 282 may be deposited directly on and may be mechanically coupled the first major surface of the separator layer 280, and the electroactive layer 274 may be deposited directly on and may be mechanically coupled the current collector layer 282. In assembly (FIG. 7), the current collector layer 282 is in direct physical contact with the electroactive layer 274 and is electrically isolated from the lithium metal layer 276 by the separator layer 280.

The separator assembly 278 has a diameter (or a width and a length) greater than that of the electrically insulating layer 284. As such, in assembly (FIG. 7), the separator assembly 278 extends beyond a periphery 286 of the electrically insulating layer 284 such that a central region of the separator assembly 278 is physically spaced apart from the bottom 270 of the metal case 258 by the electrically insulating layer 284 and a peripheral region of the separator assembly 278 is in direct physical contact with the bottom 270 of the metal case 258. In FIG. 7, a central region of the electroactive layer 274 is physically spaced apart from the bottom 270 of the metal case 258 by the electrically insulating layer 284 and a peripheral region of the electroactive layer 274 is in direct physical contact with the bottom 270 of the metal case 258. In such an arrangement, when cyclic voltammetry experiments are performed on the test cell 262, lithium ions may be directed to flow through the separator assembly 278 in the direction of the arrows 288. In particular, the lithium ions may be directed to flow through the central region of the electroactive layer 274 in a planar direction parallel to a facing surface of the electrically insulating layer 284 and the lithium ions may be directed to flow through the peripheral region of the electroactive layer 274 in a transverse direction perpendicular to the facing surface of the electrically insulating layer 284. In this way, the flow of lithium ions through the separator assembly 278 may mimic the flow of lithium ions through a reference electrode assembly of a full three-electrode electrochemical cell, such as the electrochemical cell 10 of FIG. 1.

In assembly (FIG. 7), the electroactive layer 274 and the lithium metal layer 276 are electrically coupled to the metal case 258 and the metal case 258 is electrically coupled to the controller 254 via an external circuit 256. In FIG. 7, the electroactive layer 274 is electrically coupled to the bottom 270 of the metal case 258, the lithium metal layer 276 is electrically coupled to the top 268 of the metal case 258, and the top 268 and bottom 270 of the metal case 258 are electrically isolated from one another by the gasket 272.

The test cell 262 is configured to mimic the physical and electrochemical conditions that would be experienced by the separator assembly 278 (including the separator layer 280, the current collector layer 282, and the electroactive layer 274) if the separator assembly 278 were used as a reference electrode assembly in a full three-electrode electrochemical cell, such as in the electrochemical cell 10 of FIG. 1. As such, the composition of the separator layer 280, the current collector layer 282, and the electroactive layer 274 may be substantially the same as that of the separator layer 24, the reference electrode current collector layer 28, and the reference electrode layer 30, respectively, that will be or are proposed for use.

Cyclic voltammetry experiments may be performed by the controller 254 on the test cell 262 of the test cell assembly 252 and on a control cell 362 of a control cell assembly 352 (FIG. 8) to assess characteristics of the separator assembly 278 and/or to assess the compatibility and/or electrochemical stability of the separator assembly 278 in the environment of the test cell 262. The control cell 362 and the control cell assembly 352 may be configured to serve as an experimental control so that an accurate assessment of the separator assembly 278 can be made. As such, the control cell 362 may include the same components arranged in substantially the same way as that of the test cell 262, except that the control cell 362 may not include the separator assembly 278 or the electrically insulating layer 284. The control cell 362 and the control cell assembly 352 are similar in many respects to the test cell 262 of the test cell assembly 252 discussed above with respect to FIGS. 6-7 and common subject matter may not be repeated here.

Figure 8:
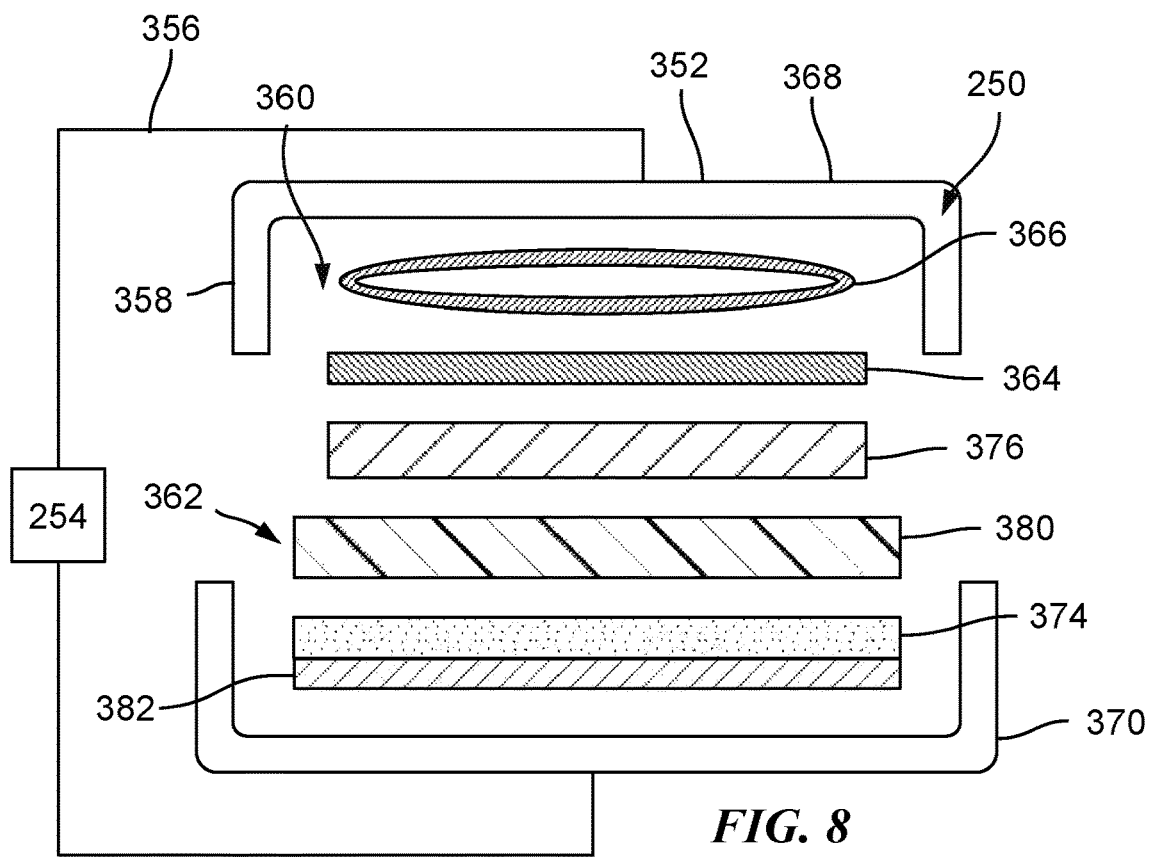
FIG. 8 is a schematic cross-sectional view of a control cell assembly electrically coupled to the controller of FIGS. 6 and 7, the control cell assembly including a two-electrode electrochemical control cell.

As shown in FIG. 8, the control cell assembly 352 may comprises a metal case 358 defining an interior 360 and a two-electrode electrochemical control cell 362 disposed within the interior 360 and electrically coupled to the metal case 358. Like the test cell assembly 252, the control cell assembly 352 may further comprise a metal spacer 364 and/or a biasing member 366. The metal case 358 may comprise a top 368 and a bottom 370 that together define the interior 360 of the metal case 358. The top 368 and the bottom 370 may be hermetically sealed together via a gasket (not shown). The control cell 362 comprises a lithium metal layer 376, an electroactive layer 374 deposited on a major surface of a current collector foil 382, and a separator layer 380 disposed between the lithium metal layer 376 and the electroactive layer 374. In assembly, the electroactive layer 374 and the lithium metal layer 376 are electrically coupled to the metal case 358 and the metal case 358 is electrically coupled to the controller 254 via an external circuit 356. In FIG. 8, the electroactive layer 374 is electrically coupled to the bottom 370 of the metal case 358 via the current collector foil 382, the lithium metal layer 376 is electrically coupled to the top 368 of the metal case 358, and the top 368 and bottom 370 of the metal case 358 are electrically isolated from one another by a gasket (not shown).

The cyclic voltammetry experiments performed on the test cell 262 and on the control cell 362 may be controlled by the controller 254. During the cyclic voltammetry experiments performed on the test cell 262, an electric potential may be applied between the electroactive layer 274 and the lithium metal layer 276 by the controller 254. The potential of the electroactive layer 274 may be calculated by the controller 254 based upon the applied electric potential between the electroactive layer 274 and the lithium metal layer 276 and the electric potential of the lithium metal layer 276, which maintains a constant potential. During the cyclic voltammetry experiments performed on the test cell 262, the potential of the electroactive layer 274 (relative to that of the lithium metal layer 276) is ramped from an initial potential to a set potential, and then the potential of the electroactive layer 274 is ramped in the opposite direction to return the potential to the initial potential. As the potential of the electroactive layer 274 is cycled, the electric current at the electroactive layer 274 may be continuously, periodically, or repeatedly measured by the controller 254 and stored in memory. The current and the potential of the electroactive layer 274 may be recorded during the cyclic voltammetry experiments by the controller 254 and may be stored in memory of the controller 254. The current and the potential of the electroactive layer 274 (the cyclic voltametric data) recorded during the cyclic voltammetry experiments may be plotted against each other (Current, I vs. Potential, V) to obtain a cyclic voltammogram of the test cell 262. The same cyclic voltammetry experiments performed on the test cell 262 may be performed on the control cell 362, with an electric potential applied between the electroactive layer 374 and the lithium metal layer 376 by the controller 254. Cyclic voltammograms may be prepared, for example, by the controller 254 using the cyclic voltametric data generated during the cyclic voltammetry experiments performed on the control cell 362 and using the cyclic voltametric data generated during the cyclic voltammetry experiments performed on the test cell 262. In some situations, cyclic voltammetry experiments may be performed by the controller 254 on the control cell 362 prior to performing cyclic voltammetry experiments on the test cell 262. In such case, the cyclic voltametric data generated during the cyclic voltammetry experiments performed on the control cell 362 may be stored in memory of the controller 254 for future reference in assessing certain characteristics of the separator assembly 278.

Figure 9:
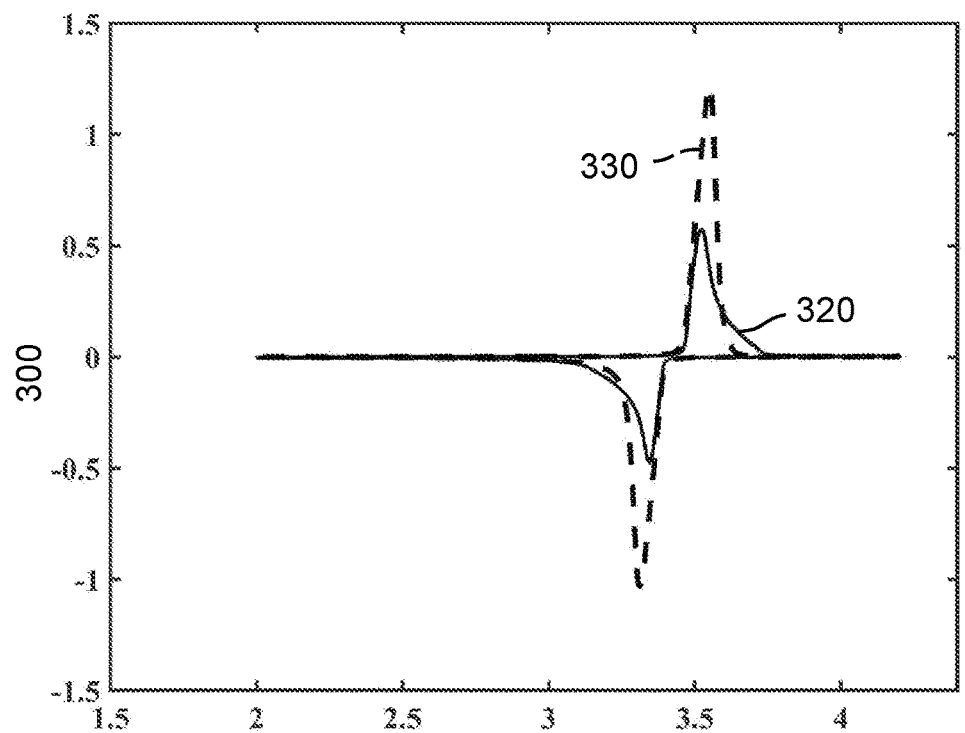
FIG. 9 depicts cyclic voltammograms of Current (I) vs. Potential (V) of the two-electrode electrochemical test cell of FIGS. 6 and 7 and of the two-electrode electrochemical control cell of FIG. 8.

A comparison of the cyclic voltammogram of the test cell 262 and the cyclic voltammogram of the control cell 362 may provide an indication of the electrochemical performance and/or the electrochemical stability of the separator assembly 278 in the environment of the test cell 262. FIG. 9 depicts an example cyclic voltammogram 320 of Current (I) 300 vs. Potential (V) 310 of the test cell 262 (solid lines) and an example cyclic voltammogram 330 of Current (I) 300 vs. Potential (V) 310 of the control cell 362 (dashed lines). As shown in FIG. 9, the voltage peaks in the cyclic voltammogram 320 of the test cell 262 and the voltage peaks in the cyclic voltammogram 330 of the control cell 362 are substantially aligned with each other. The alignment of the voltage peaks in the cyclic voltammogram 320 of the test cell 262 and the cyclic voltammogram 330 of the control cell 362 indicates that the separator assembly 278 (including the separator layer 280, the current collector layer 282, and the electroactive layer 274) can be used as a reference electrode assembly in a full three-electrode electrochemical cell, such as in the electrochemical cell 10 of FIG. 1, to obtain accurate electrochemical potential measurements of the positive and/or negative electrodes of the electrochemical cell.

The foregoing description of the embodiments has been provided for purposes of illustration and description. It is not intended to be exhaustive or to limit the disclosure. Individual elements or features of a particular embodiment are generally not limited to that embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for assessing a characteristic of a current collector layer of a reference electrode assembly for an electrochemical cell that cycles lithium ions, the system comprising:
   a controller; and
   a test cell assembly comprising:
      a first metal case comprising a top and a bottom that together define an interior of the first metal case, the top of the first metal case being electrically coupled to the controller via a first electrical connector and the bottom of the first metal case being electrically coupled to the controller via a second electrical connector, and
      a test cell disposed within the interior of the first metal case, the test cell comprising a first electroactive layer, a first lithium metal layer, and a separator assembly disposed between the first electroactive layer and the first lithium metal layer, the separator assembly comprising a first separator layer having a first major surface and a current collector layer deposited on the first major surface of the first separator layer, the current collector layer being electrically isolated from the lithium metal layer by the first separator layer, and the current collector layer being in direct physical contact with the first electroactive layer,
   wherein the first lithium metal layer is electrically coupled to the top of the first metal case and the first electroactive layer is electrically coupled to the bottom of the first metal case.

2. The system of claim 1, wherein the test cell assembly further comprises a metal spacer and a biasing member disposed between the test cell and the top of the first metal case.

3. The system of claim 1, wherein the top and the bottom of the first metal case are electrically isolated from each other by a gasket.

4. The system of claim 1, wherein the test cell assembly consists of:
   the first metal case, and
   the test cell.

5. The system of claim 1, wherein the top and bottom of the first metal case comprise stainless steel.

6. The system of claim 1, wherein the controller is configured to generate a test cell cyclic voltammogram by applying an electric potential between the first electroactive layer and the first lithium metal layer, cycling the applied electric potential between an initial potential and a set potential, and measuring an electric current at the first electroactive layer as the applied electric potential is cycled between the initial potential and the set potential.

7. The system of claim 6, wherein the controller is configured to provide an indication of at least one of an ionic permeability of the current collector layer, compatibility of the current collector layer and the first electroactive layer, or electrochemical stability of the current collector layer in an environment of the test cell.

8. The system of claim 1, further comprising:
   a control cell assembly comprising:
      a second metal case comprising a top and a bottom that together define an interior of the second metal case, the top of the second metal case being electrically coupled to the controller via a third electrical connector and the bottom of the second metal case being electrically coupled to the controller via a fourth electrical connector; and
      a control cell disposed within the interior of the second metal case, the control cell comprising a second electroactive layer, a second lithium metal layer, and a second separator layer disposed between and being in direct physical contact with the second electroactive layer and the second lithium metal layer,
   wherein the second lithium metal layer is electrically coupled to the top of the second metal case and the second electroactive layer is electrically coupled to the bottom of the second metal case.

9. The system of claim 8, wherein the controller is configured to generate a control cell cyclic voltammogram by applying an electric potential between the second electroactive layer and the second lithium metal layer, cycling the applied electric potential between an initial potential and a set potential, and measuring an electric current at the second electroactive layer as the applied electric potential is cycled between the initial potential and the set potential.

10. A method of assessing a characteristic of the current collector layer of claim 1, the method comprising:
   applying an electric potential between the first electroactive layer and the first lithium metal layer;
   cycling the electric potential between an initial potential and a set potential;
   measuring an electric current at the first electroactive layer as the electric potential is cycled between the initial potential and the set potential;
   calculating an electric potential of the first electroactive layer;
   generating a test cell cyclic voltammogram of the electric current at the first electroactive layer versus the electric potential of the first electroactive layer; and
   comparing the test cell cyclic voltammogram to a control cell cyclic voltammogram to obtain an indication of at least one of an ionic permeability of the current collector layer, a compatibility of the current collector layer and the first electroactive layer, or an electrochemical stability of the current collector layer in an environment of the test cell.

11. A system for assessing a characteristic of a reference electrode assembly for an electrochemical cell that cycles lithium ions, the system comprising:
   a controller; and
   a test cell assembly comprising:
      a first metal case comprising a top and a bottom that together define an interior of the first metal case, the top of the first metal case being electrically coupled to the controller via a first electrical connector and the bottom of the first metal case being electrically coupled to the controller via a second electrical connector; and
      a test cell disposed within the interior of the first metal case, the test cell comprising a first lithium metal layer, an electrically insulating layer, and a separator assembly disposed between the first lithium metal layer and the electrically insulating layer, the separator assembly comprising a first separator layer having a first major surface, a current collector layer deposited on the first major surface of the first separator layer, and a first electroactive layer deposited on the first major surface of the first separator layer such that the first electroactive layer at least partially overlaps the current collector layer, wherein the current collector layer is in direct physical contact with the first electroactive layer and is electrically isolated from the lithium metal layer by the first separator layer, and wherein the separator assembly extends beyond a periphery of the electrically insulating layer such that a central region of the first electroactive layer is physically spaced apart from the bottom of the first metal case by the electrically insulating layer and a peripheral region of the first electroactive layer is in direct physical contact with the bottom of the first metal case.

12. The system of claim 11, wherein the first lithium metal layer is electrically coupled to the top of the first metal case and the first electroactive layer is electrically coupled to the bottom of the first metal case.

13. The system of claim 11, wherein the electrically insulating layer is disposed on the bottom of the first metal case and the separator assembly is disposed on the bottom of the first metal case over the electrically insulating layer such that, during cycling of the test cell, electrons flow in a planar direction through the central region of the first electroactive layer and in a transverse direction through the peripheral region of the first electroactive layer.

14. The system of claim 11, wherein the controller is configured to generate a test cell cyclic voltammogram by applying an electric potential between the first electroactive layer and the first lithium metal layer, cycling the applied electric potential between an initial potential and a set potential, and measuring an electric current at the first electroactive layer as the applied electric potential is cycled between the initial potential and the set potential.

15. The system of claim 14, wherein the controller is configured to provide an indication of at least one of electrochemical performance of the separator assembly or electrochemical stability of the separator assembly in an environment of the test cell.

16. The system of claim 11, further comprising:
a control cell assembly comprising:
a second metal case comprising a top and a bottom that together define an interior of the second metal case, the top of the second metal case being electrically coupled to the controller via a third electrical connector and the bottom of the second metal case being electrically coupled to the controller via a fourth electrical connector; and
a control cell disposed within the interior of the second metal case, the control cell comprising a second lithium metal layer, a second electroactive layer disposed on a current collector foil, and a second separator layer disposed between the second lithium metal layer and the second electroactive layer,
wherein the second lithium metal layer is electrically coupled to the top of the second metal case and the second electroactive layer is electrically coupled to the bottom of the second metal case via the current collector foil.

17. The system of claim 16, wherein the current collector foil is in physical and electrical contact with the bottom of the second metal case.

18. A method for assessing a characteristic of the separator assembly of claim 11, the method comprising:
applying an electric potential between the first electroactive layer and the first lithium metal layer;
cycling the electric potential between an initial potential and a set potential;
measuring an electric current at the first electroactive layer as the electric potential is cycled between the initial potential and the set potential;
calculating an electric potential of the first electroactive layer;
generating a test cell cyclic voltammogram of the electric current at the first electroactive layer versus the electric potential of the first electroactive layer; and
comparing the test cell cyclic voltammogram to a control cell cyclic voltammogram to obtain an indication of at least one of an electrochemical performance of the separator assembly or an electrochemical stability of the separator assembly in an environment of the test cell.

19. The method of claim 18, further comprising:
comparing the test cell cyclic voltammogram to the control cell cyclic voltammogram to determine whether voltage peaks depicted in the test cell cyclic voltammogram are in alignment with corresponding voltage peaks depicted in the control cell cyclic voltammogram.

* * * * *